United States Patent Office 3,318,957
Patented May 9, 1967

3,318,957
METHOD FOR THE PRODUCTION OF
SULFIDES
David W. Young, Homewood, Ill., assignor to Sinclair Research, Inc., New York, N.Y., a corporation of Delaware
No Drawing. Filed Jan. 10, 1964, Ser. No. 336,883
5 Claims. (Cl. 260—609)

This invention is directed to an improvement in the method for the preparation of bis(aliphatic)sulfides by the reaction of an aliphatic chloride and an alkali metal sulfide.

A large number of bis(aliphatic)sulfides are known to have the utility as antioxidants and antiwear agents or extreme pressure additives for lubricating oils. Many of such sulfides serve as intermediates for the formation of these additives. The most commonly employed method for the preparation of bis(aliphatic)sulfides, is the reaction of an aliphatic bromide or iodide and an alkali metal sulfide, usually sodium sulfide in an aqueous or alcoholic solution. The reaction is effected by merely heating the reaction mixture to reflux temperature and maintaining this temperature under reflux until the reaction is complete. Whereas the reaction of the bromide or iodide salt with the alkali metal salt is known to proceed with relative ease, the chloride salt, in contrast, effects a very slow reaction, whether water or an alcohol is used as the reaction solvent, and very often provides less than satisfactory yields of desired bis(aliphatic)sulfide product. Increasing the reaction temperature does not significantly improve the reaction rate and causes the formation of undesirable by-products.

It is the object of the present invention to improve the speed of this reaction when employing the chloride compounds and to effect the manufacture of good yields of bis(aliphatic)sulfide product. In accordance with the improvement of the present invention, the reaction of the aliphatic chloride and alkali sulfide is conducted as previously described except that the solvent in which the reaction takes place is a water solution containing about 2 to 40%, preferably 5 to 20%, by weight, based on the water, of an alkali metal salt of a copolymer resin of styrene and maleic anhydride. The amount of water employed is that sufficient to effect solution of the reactants and is usually at least about 50% by weight of the reactants. Although reaction temperatures beyond the boiling point of reaction mixture can be employed, they are unnecessary in most cases since a fast and efficient reaction is effected at the boiling point of the mixture. Moreover, avoidance of elevated temperatures provides the additional advantage of reducing tendencies toward by-product formation. The boiling point of the mixture will, of course, vary depending primarily upon the organic chloride selected and the type of azeotrope formed, if any. The preferred reaction temperature is at least about 75° C., ordinarily about 100 to 125° C. The reaction is conducted in the liquid phase and at a pressure sufficient to maintain the liquid phase utilized.

The styrene-maleic anhydride copolymer, the alkali metal salt of which is employed in the present invention, is a resinous copolymer of styrene and maleic anhydride having about 0.5 to 3, preferably about 1, moles of styrene per mole of maleic anhydride. The molecular weights of the copolymers of the invention are generally at least about 600. The molecular weight may be up to about 50,000 or more, often up to about 2000 but the molecular weight can be as high as desired as long as the alkali metal salt of the polymer is water-soluble. The melting points of the lower molecular weight copolymers, i.e., the copolymers of about 600 to 2000 molecular weight will generally range from about 80 to 200° C. as determined by the Fisher-Johns Melting Point Apparatus.

Preparation of the copolymer of the invention can be by any method desired. A preferred method is by solution polymerization where the monomers are polymerized in a suitable solvent employing as a polymerization catalyst a free-radical peroxide catalyst, preferably benzoyl peroxide or dicumyl peroxide, at a temperature of about 75 to 300° C. or more. Suitable solvents include the aromatic hydrocarbon solvents, which can be either the active aromatic solvents, that is, containing an active hydrogen atom, such as cumene, p-cymene, etc., or the non-active aromatics such as xylene, toluene, etc. The active aromatic solvents are chain-terminating solvents and give lower molecular weight copolymers than do the non-active aromatics under similar conditions. Other suitable solvents are the ketones, such as methylethylketone, which are also active solvents.

The preferred manner of carrying out the polymerization is by what is known in the art as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization, the formation of the copolymers causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation.

Formation of the alkali metal salt of the copolymer can be accomplished by simple hydrolysis of the copolymer with water in the presence of an alkali metal hydroxide including ammonium hydroxide. The hydrolysis can be conveniently carried out by making a slurry in distilled water of at least 2 moles of alkali metal hydroxide per mole of the repeating copolymer unit and heating over a water bath until the hydrolysis is complete. Any of the alkali metal hydroxides such as the hydroxides of sodium, potassium, lithium and ammonium can be employed but sodium hydroxide is preferred.

The aliphatic chloride employed in the reaction of the invention can be any aliphatic chloride which reacts with alkali metal sulfides to form sulfides. The aliphatic chlorides can be either the monochloride, or polychlorides. With the monochloride, reaction of 2 moles of the chloride per mole of the alkali metal sulfide will form the linear di(aliphatic)sulfide. With the polychlorides, on the other hand, equal molar proportions of the reactants usually provide a heterocyclic-S-containing compound. In the case of polychlorides, other than the dichloride, the heterocyclic-S-containing compounds may contain unreacted chlorines as substituents on the ring.

The aliphatic chlorides, e.g., the alkyl and alkenyl chlorides including the cycloalkyl and cycloalkenyl chlorides, can be straight or branched chain, saturated or unsaturated and can contain 3 to 16 carbon atoms or more. The chlorides can also contain other substituents provided the substituents do not interfere unduly with di(organic)sulfide production. Likewise, the chlorides can have their principal chain interrupted with non-interfering atoms such as S, N or O atoms.

The following example is included to illustrate a method for preparing the copolymer of the present invention and its sodium salt.

EXAMPLE I 777 grams of maleic anhydride, 828 grams of styrene and 6.3 grams of dicumyl peroxide are dissolved in 4468 ml. of cumene. The resulting solution is then fed over a 30-minute period into a 5-gallon reactor containing 4000 ml. of cumene heated to 200° C. (reflux temperature). The reactor is equipped with a stirrer, reflux condenser, thermometer, separator funnel and heating mantle. The reaction temperature of 200° C. is maintained throughout the 30-minute period. Upon completion of the feeding, the material is cooled to room temperature and the excess cumene decanted. The solidified copolymer (wet with cumene) is then ground, washed with petroleum ether, suction filtered and dried in a 90 to 100° C. oven for 1 hour. The copolymer analyzed as follows:

Viscosity, cs. at 30° C. (10% by weight/vol. in acetone) _____ 0.658
Melting range, ° C. _____ 145–160
Molecular weight * _____(approx.)__ 1350

* Calculated by intrinsic viscosity.

To prepare the disodium salt of the copolymer, 2 moles of sodium hydroxide per mole of the repeating copolymer unit are added to distilled water to provide a slurry having a solids content of about 15%. The slurry is then heated on a 70 to 80° C. water bath for about 1½ to 2 hours.

Examples II through IV below are included to illustrate the advantageous results provided by the improved method of the present invention.

EXAMPLE II

*Bis(2-ethylhexyl)sulfide*

A mixture of 75 g. of 2-ethylhexyl chloride, 65 g. of sodium sulfide monohydrate and 300 ml. of water with 5% of the sodium salt of copolymer of Example I was maintained at the boiling point under reflux for about eight hours. The course of the reaction was followed by removing a small sample of the upper phase from time to time and checking its refractive index. This property indicated a rapid reaction during the early stages. As stated, after eight hours, the upper layer was separated, washed twice with water, and dried over calcium chloride. Fractionation gave 7.2 g. of 2-ethylhexyl chloride, followed by 51 g. of colorless bis(2-ethylhexyl)sulfide analyzing as follows:

*Analysis.*—Calcd. for $C_{16}H_{34}S$: percent C, 74.34; percent H, 13.26; percent S, 1240. Found: percent C, 74.16; percent H, 13.10; percent S, 12.44.

Refractive index, $n_D^{25}$, 1.4622.

For comparison, a run was made without the sodium salt of the copolymer. A yield of 33% in 24 hours was obtained.

To demonstrate the importance of using water as a solvent in the method of the invention, the original run was repeated, that is, with the sodium salt but with ethylene glycol as the solvent instead of water. It required 24 hours to give a 76% yield of product.

EXAMPLE III

A mixture of 63.5 g. (½ mole) of 1,4-dichlorobutane and 120 g. (½ mole) of sodium sulfide monohydrate was heated under reflux for 8.5 hours. The refractive index of the upper layer increased from $n_D^{20}$ 1.4551 to $n_D^{20}$ 1.4562 during this time, indicating very little reaction. At this point 100 ml. of water was added and the heating was continued for 15 hours. No change was indicated in the refractive index of the upper layer. At this point 10 g. of the disodium salt of the copolymer of Example I was added and heating was continued for 8 hours. The refractive index of the upper layer increased rapidly to a final value of $n_D^{20}$ 1.5039. At this point the upper layer was separated, washed three times with 10% sodium chloride solution, and dried over calcium chloride. Fractionation gave a yield of 60.9 g. of tetramethylene sulfide at 120–121.5°.

EXAMPLE IV

Isooctenyl chloride (75 g.), 65 g. of sodium sulfide monohydrate, 300 ml. of water and 5% of the Na salt of the copolymer of Example I were heated to reflux temperature and maintained under reflux for 8 hours. After 8 hours the upper layer was separated, washed with water twice, and dried over $CaCl_2$. Fractionation gave 9.29 g. of isooctenyl chloride, followed by 44 g. of bis(isooctenyl)sulfide as a colorless liquid product.

Found on analysis: percent C, 73.23; percent N, 13.00; percent S, 12.14.

It is claimed:

1. A method for the production of sulfides which comprises reacting in water as a reaction medium an alkali metal sulfide and a chloride selected from the group consisting of alkyl and alkenyl chlorides of about 3 to 16 carbon atoms in the presence of about 2 to 40% by weight, based on the water, of a water-soluble alkali metal salt of a resinous copolymer of styrene and maleic anhydride having about 0.5 to 3 moles of styrene per mole of maleic anhydride.

2. The method of claim 1 wherein the copolymer has a styrene to maleic anhydride molar ratio of about 1 to 1.

3. The method of claim 2 wherein the alkali metal salt is the sodium salt.

4. The method of claim 3 wherein the sodium salt is added in an amount of about 5 to 20%.

5. The method of claim 4 wherein the molecular weight of the copolymer is about 600 to 2,000.

No references cited.

CHARLES B. PARKER, *Primary Examiner.*

JOSEPH P. BRUST, *Examiner.*

DELBERT R. PHILLIPS, *Assistant Examiner.*